United States Patent
Wood

(10) Patent No.: US 11,592,002 B1
(45) Date of Patent: Feb. 28, 2023

(54) RENEWABLE POWER GENERATION SYSTEM

(71) Applicant: Nathaniel Wood, Streetsboro, OH (US)

(72) Inventor: Nathaniel Wood, Streetsboro, OH (US)

(*) Notice: Subject to any disclaimer, the term of this patent is extended or adjusted under 35 U.S.C. 154(b) by 0 days.

(21) Appl. No.: 17/683,640

(22) Filed: Mar. 1, 2022

(51) Int. Cl.
   *F03D 3/02*   (2006.01)
   *F03D 15/00*  (2016.01)
   *F03D 9/25*   (2016.01)
   *F03D 3/00*   (2006.01)

(52) U.S. Cl.
   CPC .............. *F03D 3/02* (2013.01); *F03D 3/005* (2013.01); *F03D 9/25* (2016.05); *F03D 15/00* (2016.05)

(58) Field of Classification Search
   CPC ... F03D 9/25; F03D 15/00; F03D 3/02; F03D 3/04; F03D 3/0409; F03D 3/0427; F03D 3/0454; F03D 3/0481; F03D 3/06; F03D 3/065; F03B 3/16; F03B 11/02; F03B 11/066; F05B 31/10
   See application file for complete search history.

(56) References Cited

U.S. PATENT DOCUMENTS

| | | | | |
|---|---|---|---|---|
| 436,595 A | * | 9/1890 | Collins ............... | F05B 2260/72 416/119 |
| 2,335,817 A | * | 11/1943 | Topalov ............... | F03B 17/063 415/4.4 |
| 3,986,787 A | * | 10/1976 | Mouton, Jr. .......... | F03B 17/061 415/121.2 |
| 4,084,918 A | * | 4/1978 | Pavlecka ................... | F03D 3/02 415/4.4 |
| 4,174,923 A | * | 11/1979 | Williamson .......... | F03D 3/0445 415/4.4 |

(Continued)

OTHER PUBLICATIONS

Lepoix, Lous L., "Air or Hydraulic Fluid Turbine energy Converter, Uses Turbines With Adjustable Deflector Blades Round Periphery to Provide Regulation of Turbine Speed.", EPO, FR2509384A1, Jul. 8, 1981 (Year: 1981).*

(Continued)

*Primary Examiner* — Woody A Lee, Jr.
*Assistant Examiner* — Joshua R Beebe
(74) *Attorney, Agent, or Firm* — Daniel M. Cohn; Howard M. Cohn

(57) ABSTRACT

Disclosed embodiments provide a renewable power generation apparatus. In embodiments, the renewable power generation apparatus is driven by wind. In other embodiments, the renewable power generation apparatus is driven by water. Disclosed embodiments utilize two cylindrical turbines placed adjacent to each other. A diverter directs wind towards both turbines, causing them to rotate about their respective longitudinal axis. The turbines are coupled to a driveshaft that drives a generator to generate power. Embodiments utilize an airfoil adjacent to each turbine. The airfoil causes air to move faster over the airfoil surface to create low pressure which increases the performance of the turbines. The renewable power generation apparatus of disclosed embodiments is relatively compact compared to a traditional wind turbine. This allows disclosed embodiments to have more flexibility in where they are installed, facilitating local power generation, off-grid applications, and other important environmental applications.

18 Claims, 19 Drawing Sheets

(56) References Cited

U.S. PATENT DOCUMENTS

| | | | | |
|---|---|---|---|---|
| 4,764,683 | A | * | 8/1988 | Coombes .................. F03D 9/25 |
| | | | | 415/60 |
| 6,981,839 | B2 | * | 1/2006 | Fan ......................... F03D 3/002 |
| | | | | 415/4.1 |
| 8,057,159 | B2 | * | 11/2011 | Chong ...................... F03D 9/25 |
| | | | | 416/88 |
| 10,823,140 | B2 | * | 11/2020 | Samarasinha ........... F03D 80/30 |
| 2003/0122380 | A1 | * | 7/2003 | Harbison ................ F03D 80/00 |
| | | | | 290/55 |
| 2010/0034649 | A1 | * | 2/2010 | Taylor ................... F03D 3/0427 |
| | | | | 415/208.1 |
| 2014/0346774 | A1 | * | 11/2014 | Cooper ..................... F03D 9/25 |
| | | | | 290/44 |
| 2021/0079893 | A1 | * | 3/2021 | Lutz ...................... F16H 37/027 |

OTHER PUBLICATIONS

Kim, "Power Generating Apparatus of Speed Increasing Type," Korean Patent Office, KR 102129243 B1,Jul. 2, 2020 (Year: 2020).*

Wang, Hua-ming et al., "A Liftable Tide Energy Guide Flow and Shielding Device" CNIPA, CN 105422361 A, Mar. 23, 2016 (Year: 2016).*

\* cited by examiner

RENEWABLE POWER GENERATION SYSTEM

FIELD

The present invention relates generally to power generation, and more particularly to renewable power generation driven by wind and/or water.

BACKGROUND

Wind power is one of the fastest-growing energy sources in the world because of its many advantages. The wind is a clean, free, and readily available renewable energy source. Around the world, wind power generation plays an increasingly important role in supplying energy in a clean and sustainable manner.

An additional benefit of wind power is that it is a sustainable source of energy, as wind turbine operation does not directly emit any $CO_2$ or greenhouse gases, helping to meet emission reduction targets and combating climate change. Wind energy is plentiful, readily available, and capturing its power does not deplete our valuable natural resources.

In addition to wind, water can also be used to drive turbines in a clean and sustainable manner. The gravitational pull of the moon and sun along with the rotation of the earth create tides in the oceans. In some places, tides cause water levels near the shore to rise and fall considerably over the course of a tidal cycle. This change in water levels can be used to drive turbines. Tidal turbines are similar to wind turbines in that they have blades that turn a rotor to power a generator. They can be placed on the sea floor where there is strong tidal flow. Both wind and water provide opportunities for increased sustainable energy.

SUMMARY

In one embodiment, there is provided a wind turbine system comprising: a platform; a first cylindrical wind turbine mounted on the platform; a second cylindrical wind turbine mounted on the platform and disposed proximal to the first cylindrical wind turbine; a diverter mounted to the platform and disposed on a front side of the first cylindrical wind turbine and second cylindrical wind turbine; a first airfoil mounted to the platform and disposed proximal to the first cylindrical wind turbine; a second airfoil mounted to the platform and disposed proximal to the second cylindrical wind turbine; and a driveshaft disposed adjacent to, and mechanically coupled to, the first cylindrical wind turbine.

In another embodiment, there is provided a wind power generation system, comprising: an open-air structure comprising a plurality of levels, wherein each level of the plurality of levels comprises a wind turbine system comprising: a platform; a first cylindrical wind turbine mounted on the platform; a second cylindrical wind turbine mounted on the platform and disposed proximal to the first cylindrical wind turbine; a diverter mounted to the platform and disposed on a front side of the first cylindrical wind turbine and second cylindrical wind turbine; a first airfoil mounted to the platform and disposed proximal to the first cylindrical wind turbine; a second airfoil mounted to the platform and disposed proximal to the second cylindrical wind turbine; and a driveshaft disposed adjacent to, and mechanically coupled to, the first cylindrical wind turbine.

In yet another embodiment, there is provided a hydropower generation system, comprising: a platform; an anchor affixed to the platform via a tether; a first cylindrical water turbine mounted on the platform; a second cylindrical water turbine mounted on the platform and disposed proximal to the first cylindrical water turbine; a diverter mounted to the platform and disposed on a front side of the first cylindrical water turbine and second cylindrical water turbine; a first airfoil mounted to the platform and disposed proximal to the first cylindrical water turbine; a second airfoil mounted to the platform and disposed proximal to the second cylindrical water turbine; a ballast tank affixed to each airfoil; and a driveshaft disposed adjacent to, and mechanically coupled to, the first cylindrical water turbine.

BRIEF DESCRIPTION OF THE DRAWINGS

The structure, operation, and advantages of the present invention will become further apparent upon consideration of the following description taken in conjunction with the accompanying figures (FIGs.). The figures are intended to be illustrative, not limiting.

Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity. Furthermore, for clarity, some reference numbers may be omitted in certain drawings.

DETAILED DESCRIPTION

Disclosed embodiments provide a renewable power generation apparatus. In embodiments, the renewable power generation apparatus is driven by wind. In other embodiments, the renewable power generation apparatus is driven by water. Disclosed embodiments utilize two cylindrical turbines placed adjacent to each other. A diverter directs wind towards both turbines, causing them to rotate about their respective longitudinal axis. The turbines are coupled to a driveshaft that drives a generator to generate power. Embodiments utilize an airfoil adjacent to each turbine. The airfoil causes air to move faster over the airfoil surface to create low pressure which increases the performance of the turbines. The renewable power generation apparatus of disclosed embodiments is relatively compact compared to a traditional wind turbine. This allows disclosed embodiments to have more flexibility in where they are installed, facilitating local power generation, off-grid applications, and other important environmental applications.

Figure 1A:
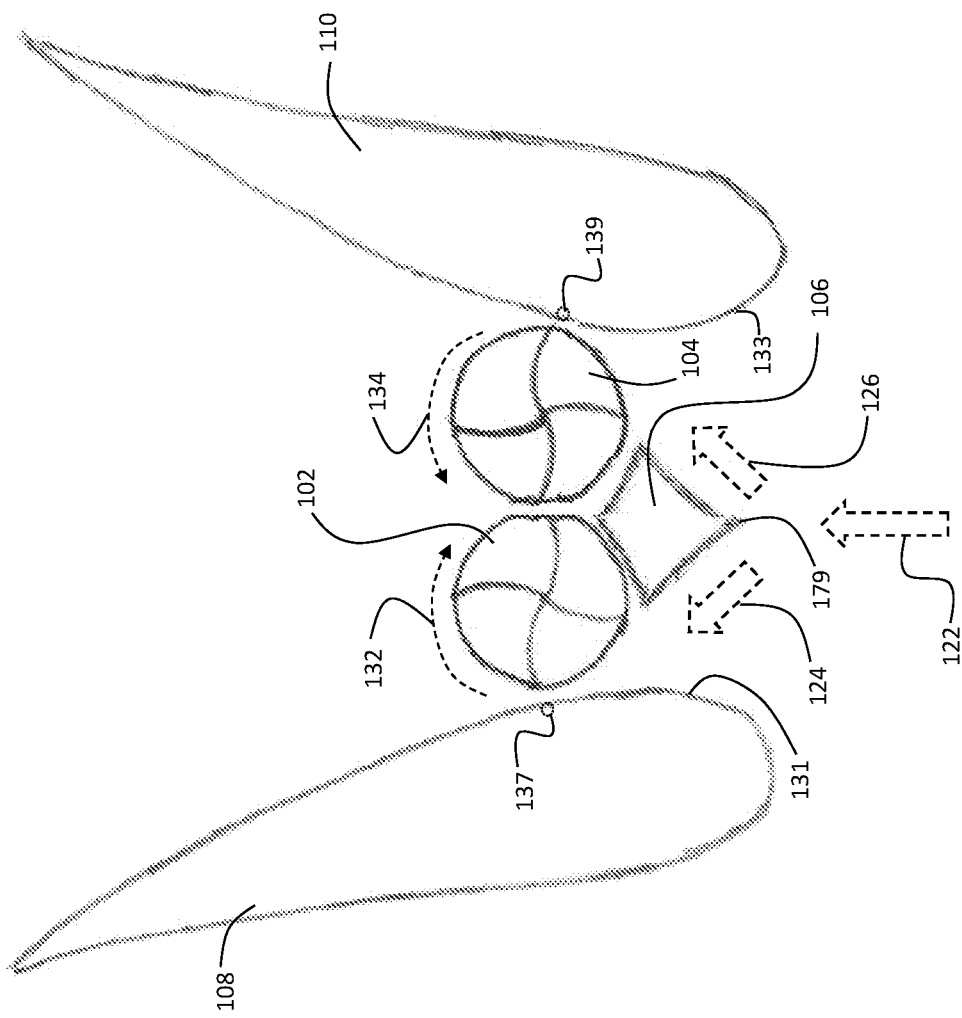
FIG. 1A is a top-down view showing components of disclosed embodiments.

FIG. 1A is a top-down view showing components of disclosed embodiments in order to illustrate the theory of operation. A first turbine 102 is disposed adjacent to a second turbine 104. A diverter 106 is disposed in front of the turbines, such that a front edge 179 of the diverter 106 directs airflow of blowing wind, indicated by arrows 122, 124, and 126, such that it engages with the turbines 102 and 104, causing them to spin in opposite directions as indicated by arrows 132 and 134. Arrow 132 shows the direction of rotation of turbine 102. Arrow 134 shows the direction of rotation of turbine 104. Airfoil 108 is disposed proximal to turbine 102. Airfoil 110 is disposed proximal to wind turbine 104. In embodiments, at its closest point, indicated by reference number 137, airfoil 108 is at a distance from its respective turbine 102 that ranges from one centimeter to five centimeters. Similarly, in embodiments, at its closest point, indicated by reference number 139, airfoil 110 is at a distance from its respective turbine 104 that ranges from one centimeter to five centimeters.

Airfoil 108 has leading edge 131 which causes air to be deflected towards turbine 102, thereby increasing its rotational speed, and improving efficiency with regards to power generation. Similarly, airfoil 110 has leading edge 133 which causes air to be deflected towards turbine 104, thereby increasing its rotational speed, and improving efficiency with regards to power generation.

Figure 1B:
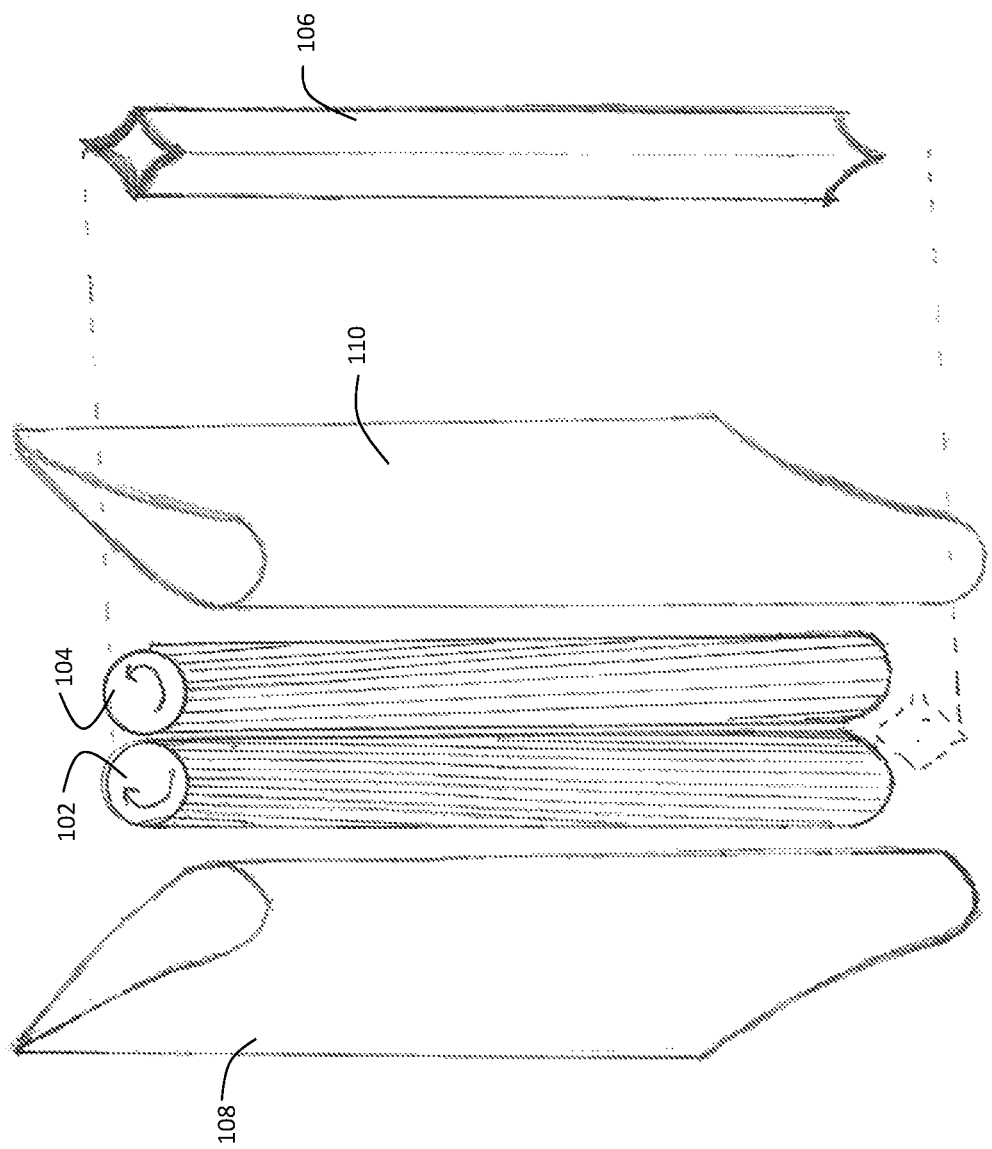
FIG. 1B is a perspective view showing components of disclosed embodiments.

FIG. 1B is a perspective view showing components of disclosed embodiments. In this view, the diverter 106 is shown in an uninstalled configuration, to reveal the cylindrical wind turbines 102 and 104, as well as the position of the airfoils 108 and 110.

Figure 2A:
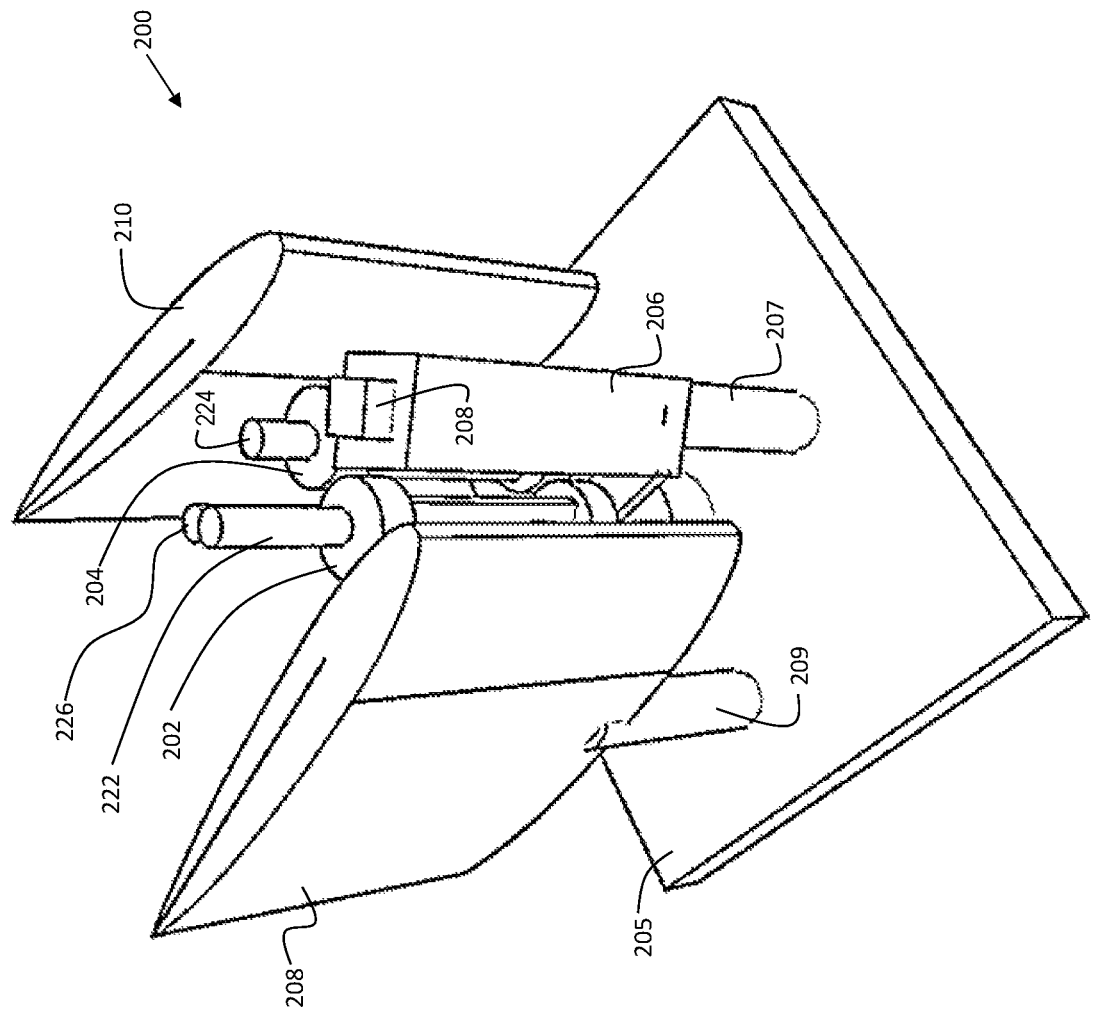
FIG. 2A shows a perspective view of an embodiment of the present invention.
Figure 2B:
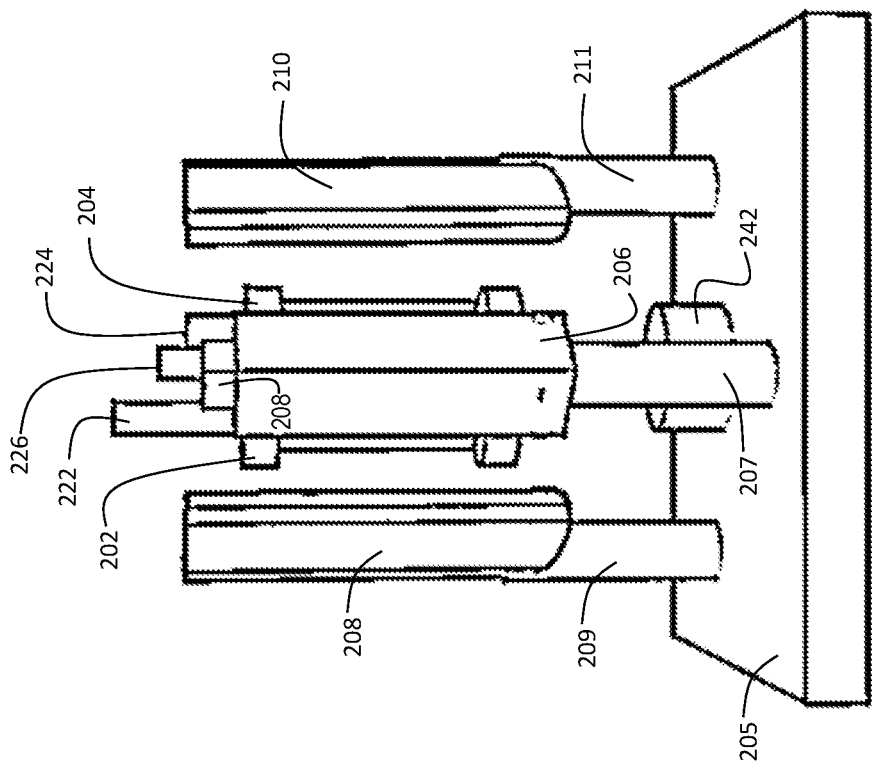
FIG. 2B shows a front view of the embodiment of FIG. 2A.
Figure 2C:
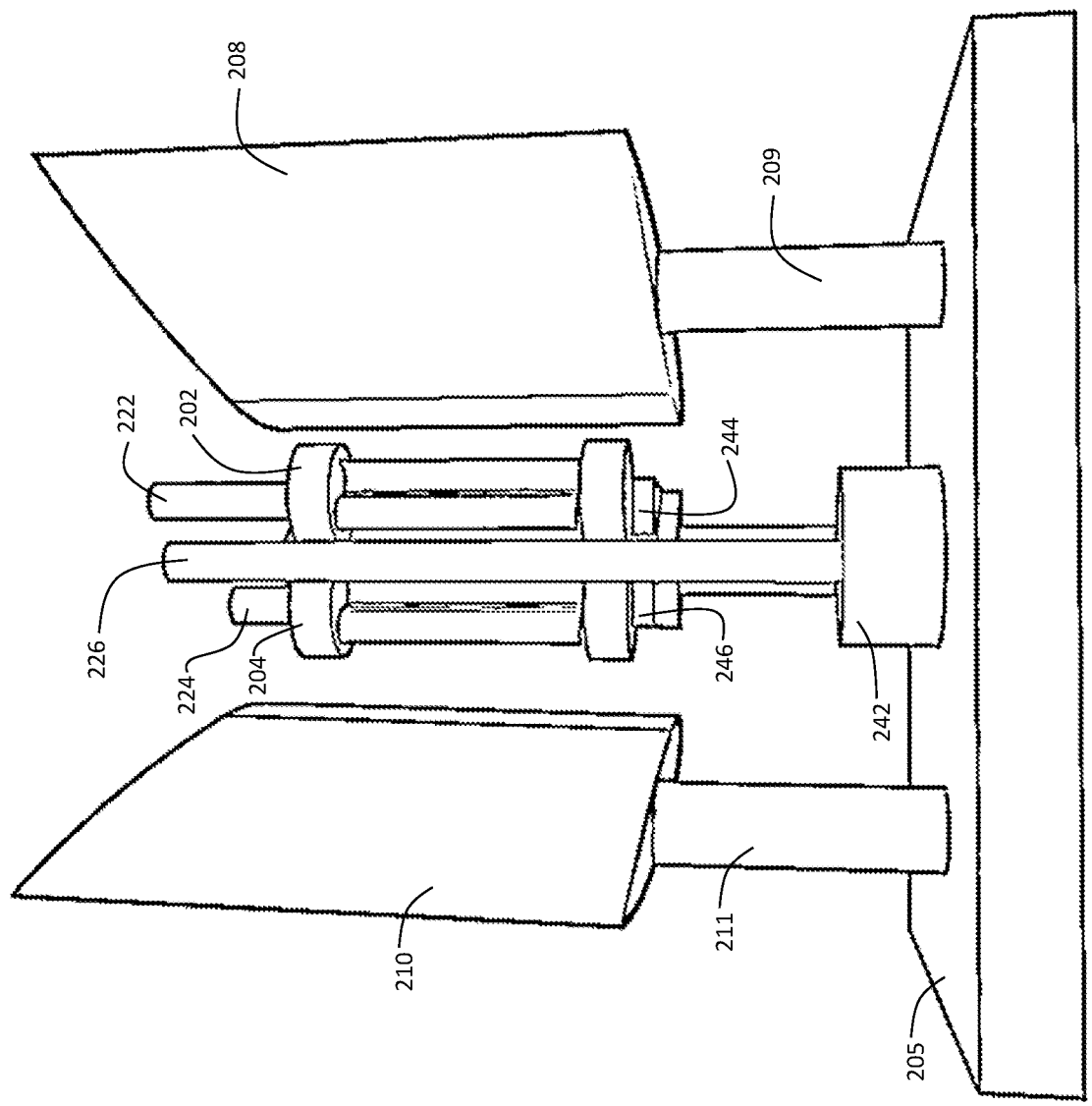
FIG. 2C shows a back view of the embodiment of FIG. 2A.
Figure 2D:
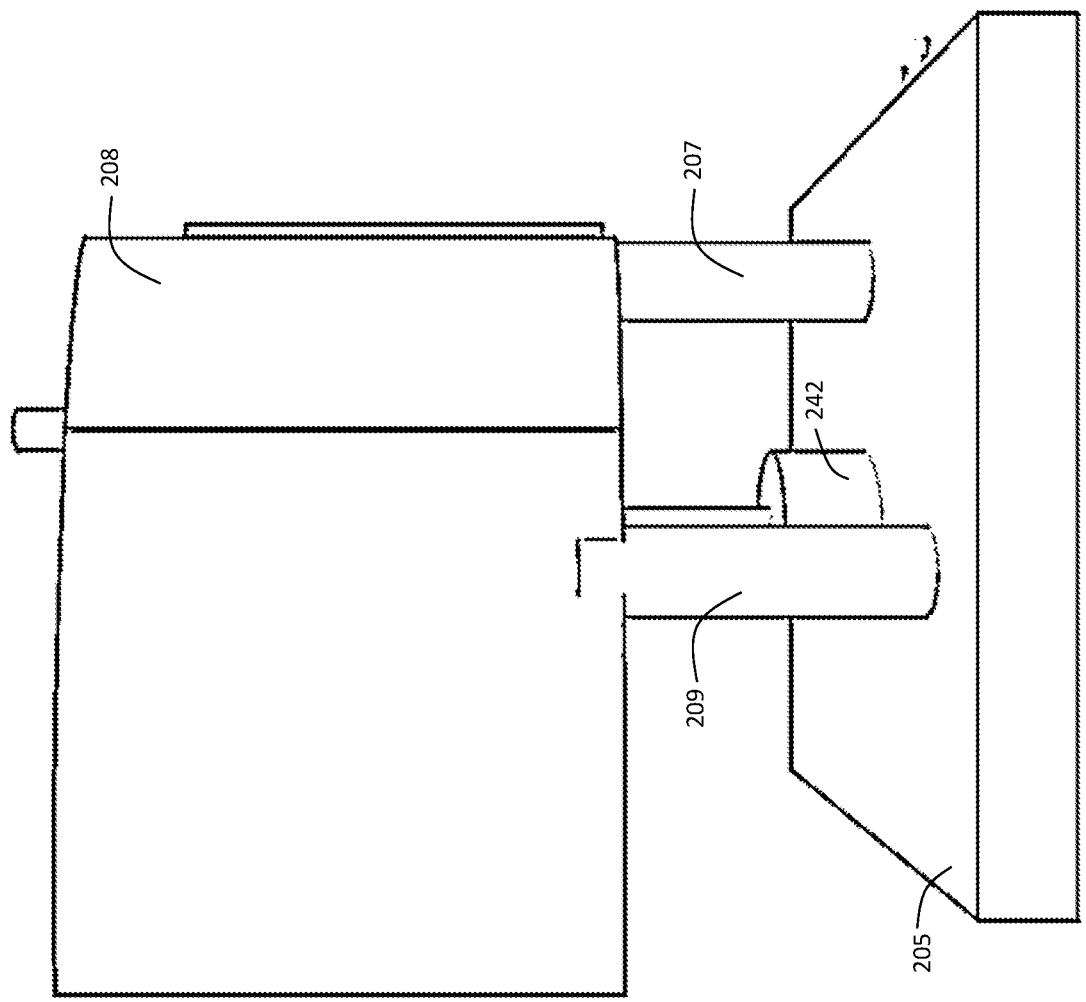
FIG. 2D shows a side view of the embodiment of FIG. 2A.
Figure 2E:
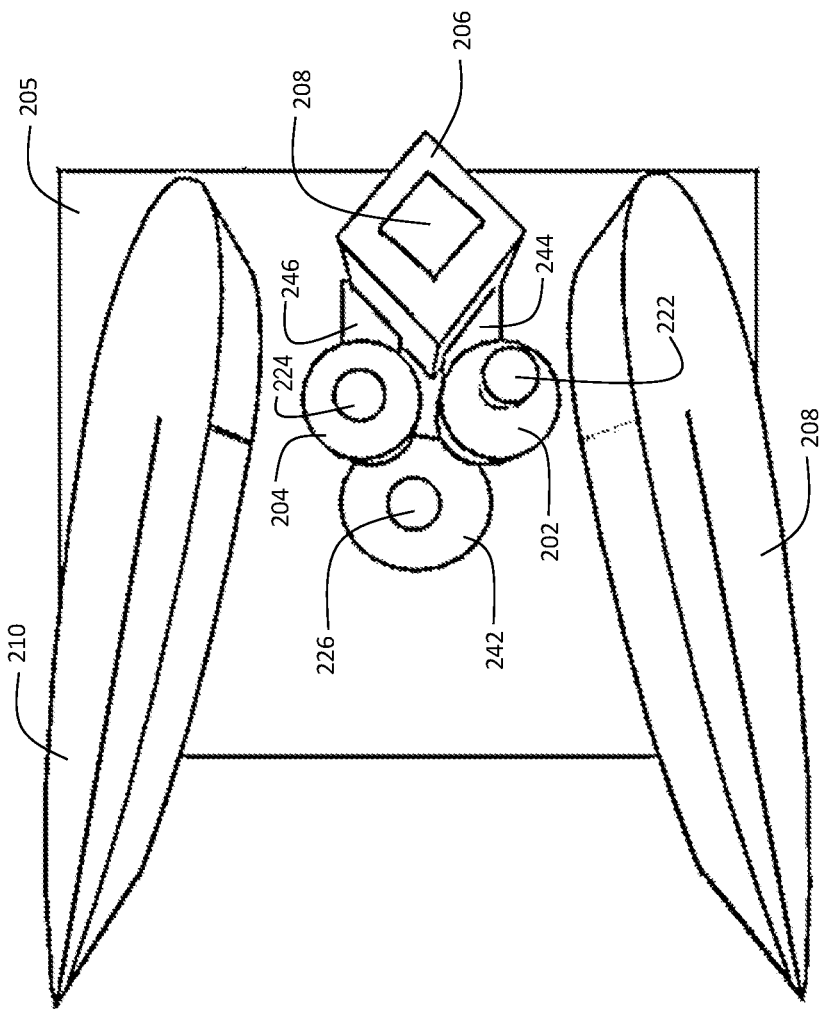
FIG. 2E shows a top-down view of the embodiment of FIG. 2A.

FIG. 2A shows a perspective view of an embodiment of the present invention. FIG. 2B shows a front view of the embodiment of FIG. 2A. FIG. 2C shows a back view of the embodiment of FIG. 2A. FIG. 2D shows a side view of the embodiment of FIG. 2A. FIG. 2E shows a top-down view of the embodiment of FIG. 2A. Renewable power generation apparatus 200 includes a platform 205. The first airfoil 208 is mounted to the platform via post 209. The diverter 206 is mounted to the platform via post 207. The second airfoil 210 is mounted to the platform via post 211. A generator 242 is disposed on the platform 205. The first turbine 202 is supported by a bracket 244 that is affixed to the diverter 206. The second turbine 204 is supported by a bracket 246 that is affixed to the diverter 206. The first turbine 202 has a shaft 222 coupled to it, such that as the turbine 202 rotates, shaft 222 also rotates. The second turbine 204 has a shaft 224 coupled to it, such that as the turbine 204 rotates, shaft 224 also rotates. The generator 242 has driveshaft 226 coupled to it, such that as the driveshaft 226 rotates, the generator creates a rotating magnetic field that produces electric power.

A gearbox 208 is disposed on the diverter 206. The gearbox 208 includes gears and pullies to mechanically couple the opposing turbines 202 and 204 to the driveshaft 226, to provide rotation for the generator 242. Thus, embodiments include an electric generator coupled to the driveshaft. In embodiments, the generator comprises a doubly-fed induction generator.

Figure 2F:
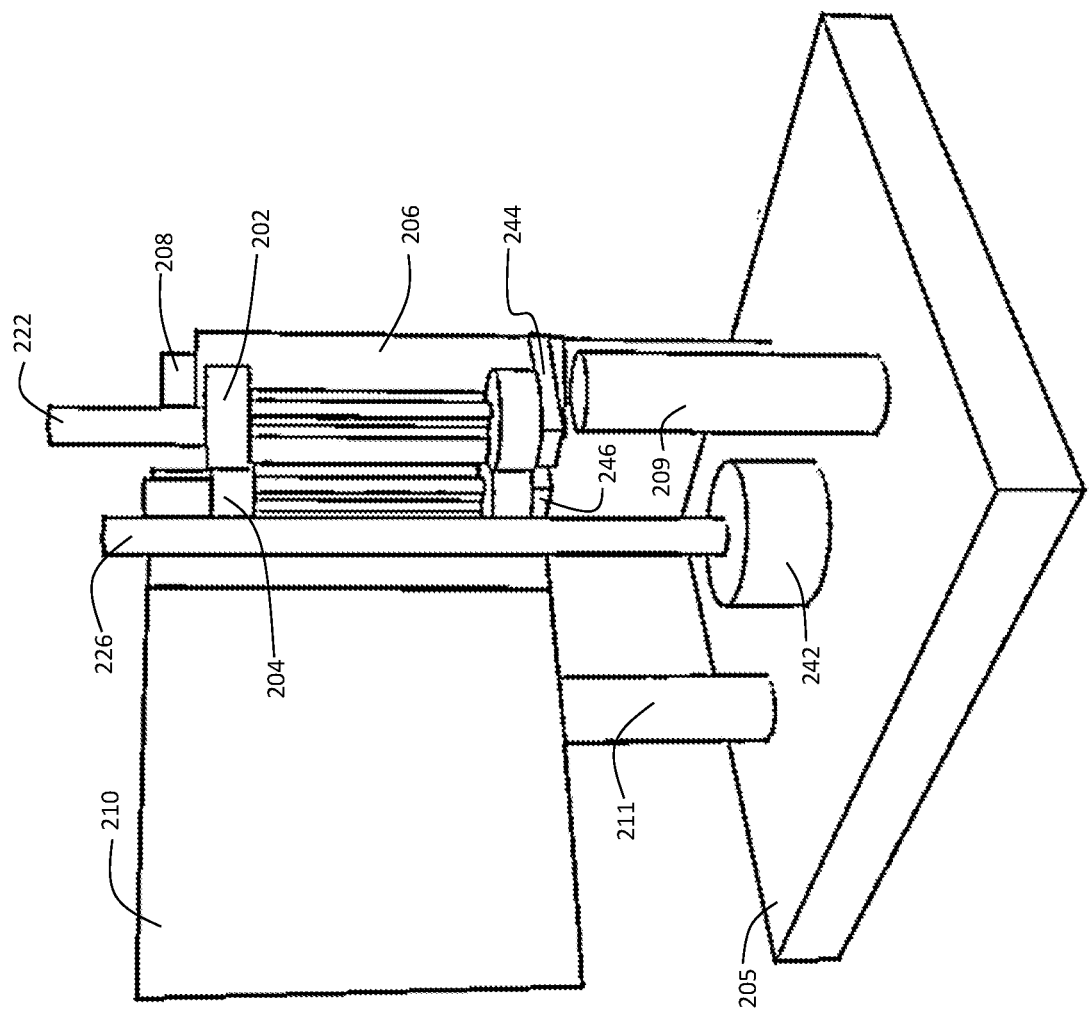
FIG. 2F shows a rear-perspective view of the embodiment of FIG. 2A with an airfoil removed.

FIG. 2F shows a rear-perspective view of the embodiment of FIG. 2A with an airfoil removed. In this view, the support bracket 244 for mounting of turbine 202 is seen. Behind turbine 202, the support bracket 246 for mounting of turbine 204 is seen. The support brackets 244 and 246 are affixed to the diverter 206, and extend perpendicularly from the diverter 206.

Figure 3A:
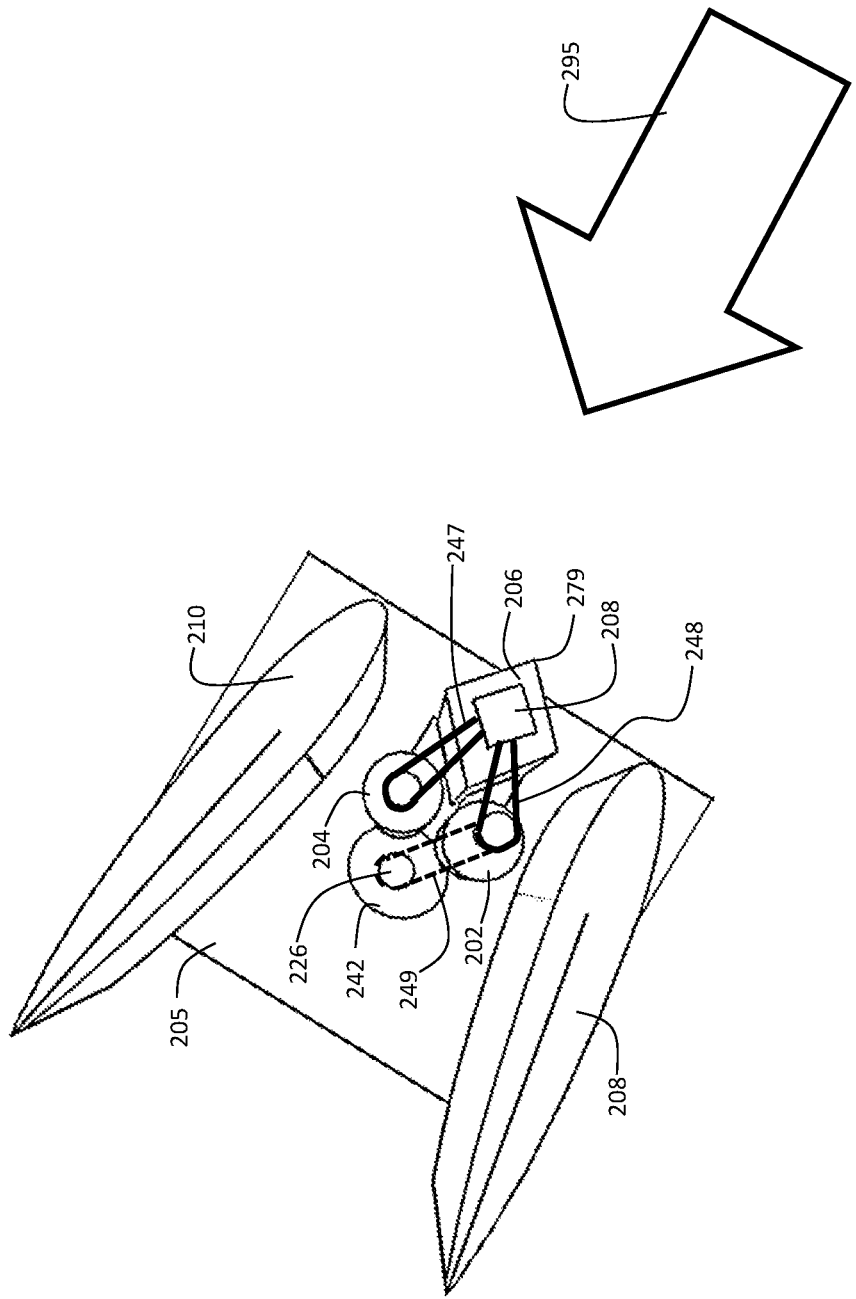
FIG. 3A shows a top-down view of an embodiment of the present invention showing belt installation.
Figure 3B:
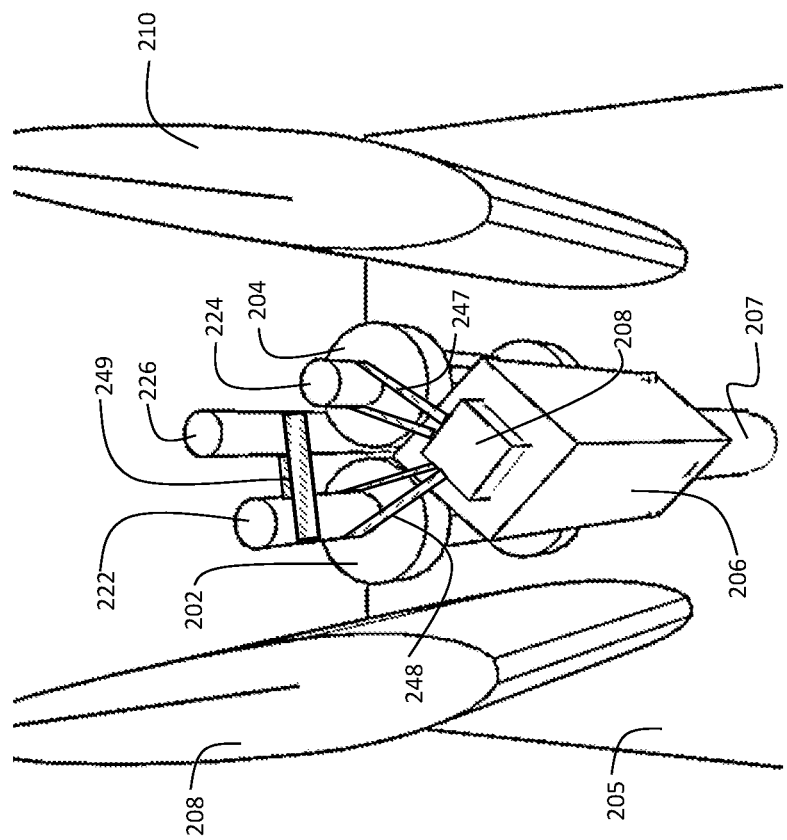
FIG. 3B shows a front-perspective view of the embodiment of FIG. 3A.

FIG. 3A shows a top-down view of the embodiment of FIGS. 2A-2F, showing belt installation. FIG. 3B shows a front-perspective view of the embodiment of FIG. 3A. A first belt 249 couples the first cylindrical wind turbine 202 to the driveshaft 226. The belt 249 is fitted with tension around shaft 222 and driveshaft 226. A second belt 247 mechanically couples the turbine 204 to the gearbox 208. A third belt 248 mechanically couples the gearbox to the first turbine 202. Wind, indicated as arrow 295, moves towards the turbines. Disclosed embodiments provide the combined power of turbine 202 and turbine 204 to move the driveshaft 226, thereby increasing power output as compared with a single turbine.

Embodiments include a first belt, the first belt mechanically coupling the first cylindrical wind turbine to the driveshaft. Embodiments may further include a gearbox, the gearbox mounted on the diverter. Embodiments may further include a second belt, the second belt mechanically coupling the second cylindrical wind turbine to the gearbox; and a third belt, the third belt mechanically coupling the gearbox to the first cylindrical turbine. Embodiments may utilize pullies, detents, or other mechanical techniques to hold the belts in place on their respective shafts. In some embodiments, a direct-drive arrangement between a turbine and the driveshaft may be utilized instead of belts.

Figure 4A:
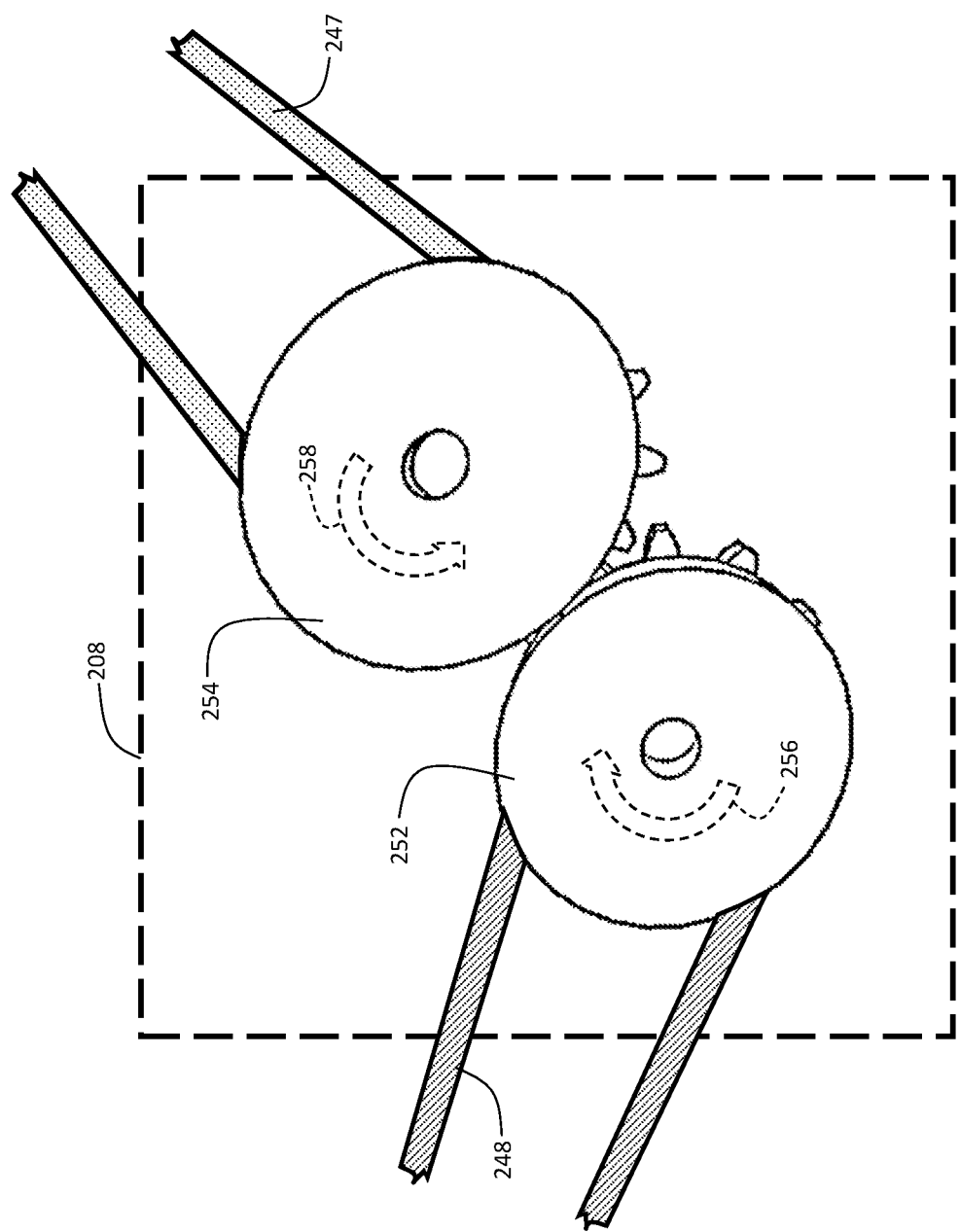
FIG. 4A shows a top-down view of internal details of the gearbox.

FIG. 4A shows a top-down view of internal details of the gearbox. In this view, a first pulley 252 is shown adjacent to a second pulley 254. Belt 247 is installed with suitable tension around pulley 254. Belt 248 is installed with suitable tension around pulley 252. During operation, pulley 252 rotates in the direction indicated by arrow 256, while pulley 254 rotates in the direction indicated bay arrow 258. Thus, the gearbox 208, mounted on the diverter 206, converts the opposite rotation of turbine 204 to the same direction as turbine 202, so that wind that causes turbine 204 to rotate also contributes to the power applied to driveshaft 226.

Figure 4B:
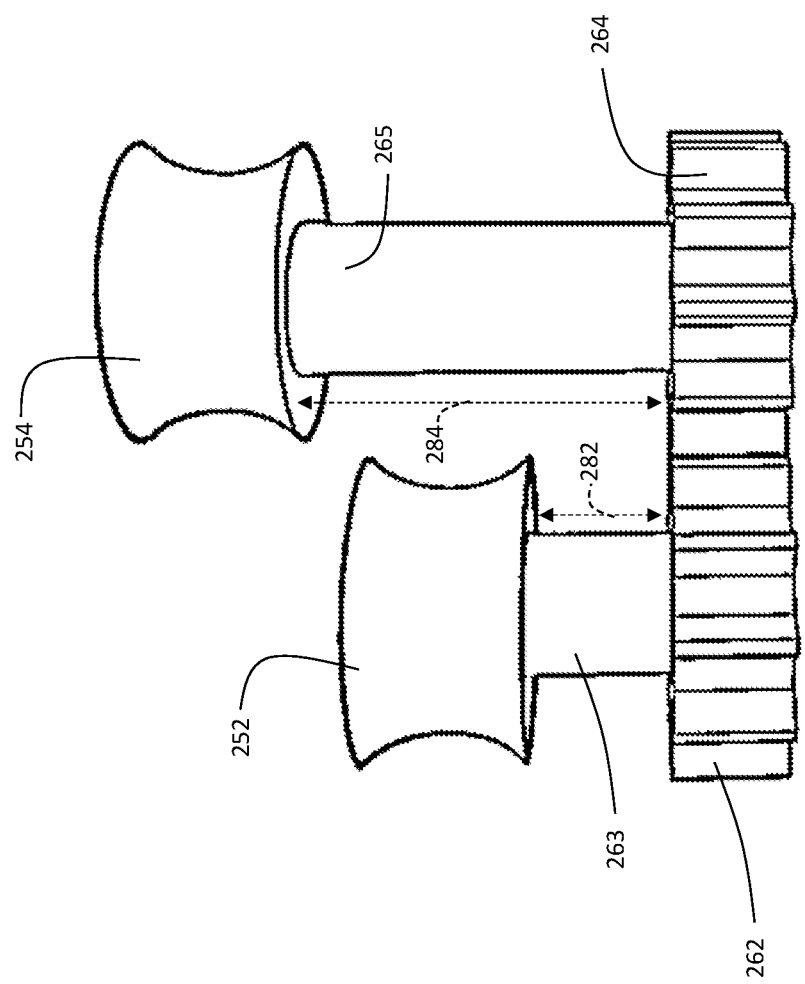
FIG. 4B is a side view showing internal details of the gearbox.
Figure 4C:
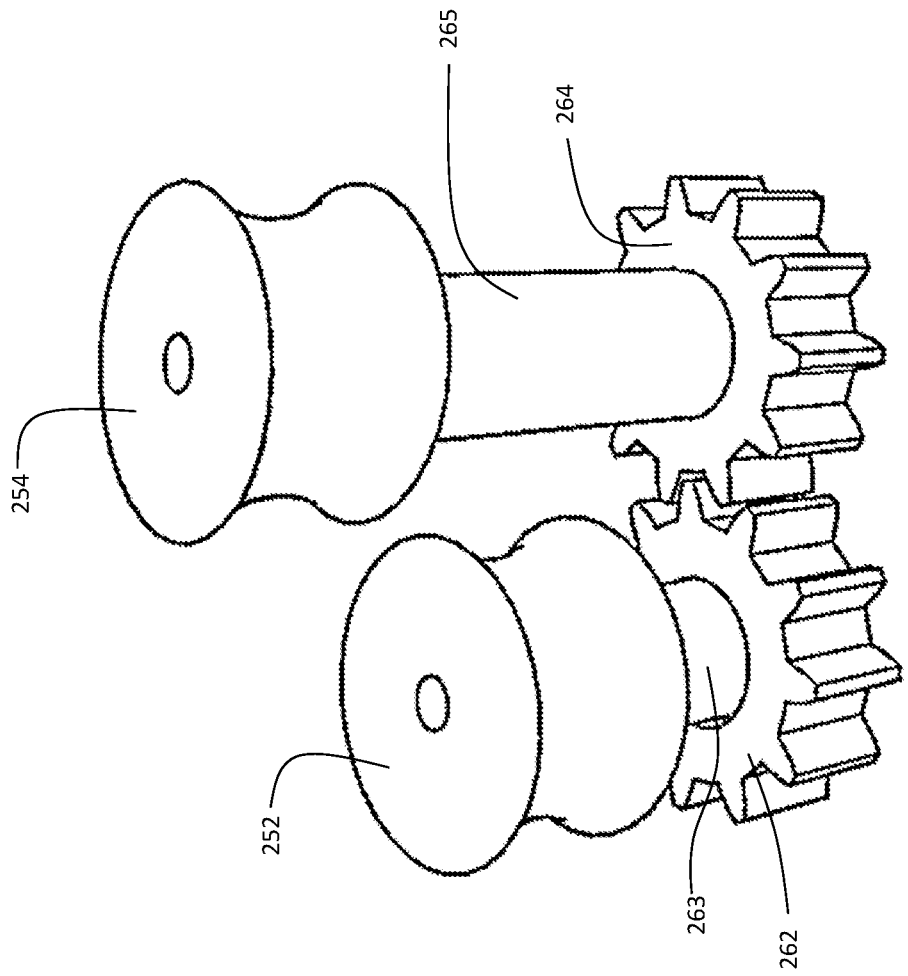
FIG. 4C is a perspective view showing internal details of the gearbox.

FIG. 4B is a side view showing internal details of the gearbox. FIG. 4C is a perspective view showing internal details of the gearbox. In FIG. 4B and FIG. 4C the gearbox internals are shown, including a first gear 262 that is interlocked with a second gear 264. A first post 263 having a height 282 mechanically couples pulley 252 to gear 262. A second post 265 having a height 284 mechanically couples pulley 254 to gear 264. In embodiments, height 282 is unequal to height 284. Thus, as the turbine 204 rotates, the belt 247 causes pulley 254 to rotate in the direction indicated by arrow 258 (FIG. 4A). This causes gear 262 to rotate, causing pulley 252 to rotate in the direction indicated by arrow 256 (FIG. 4A). In this way, the opposite rotation of the turbines 202 and 204 are converted to a synergistic rotational energy that contributes to the rotational motion of driveshaft 226 to obtain electric power from generator 242 via rotational energy of the driveshaft 226.

In embodiments, the gearbox comprises: a first gear; a second gear, the second gear interlocked with the first gear; a first pulley, the first pulley mechanically coupled to the first gear; and a second pulley, the second pulley mechanically coupled to the second gear. In embodiments, the first pulley is mounted on a first post having a first height, and wherein the second pulley is mounted on a second post having a second height, and wherein the first height is unequal to the second height.

Figure 5B:
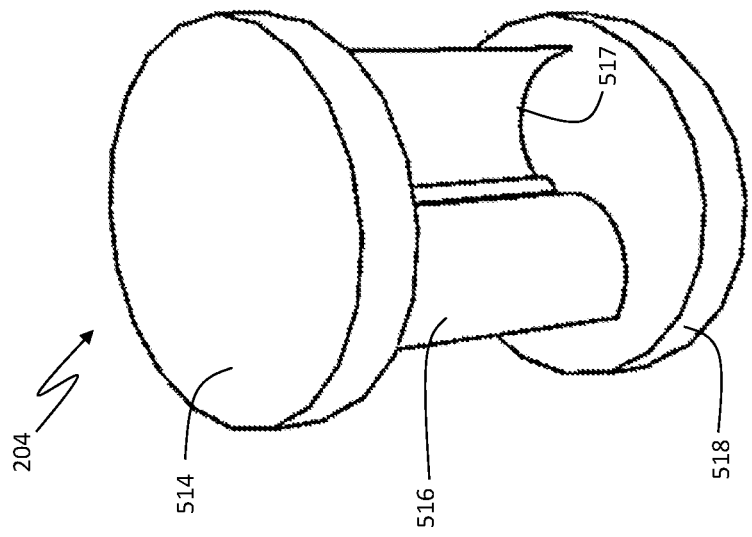
FIG. 5B shows a perspective view of the right wind turbine.
Figure 5A:
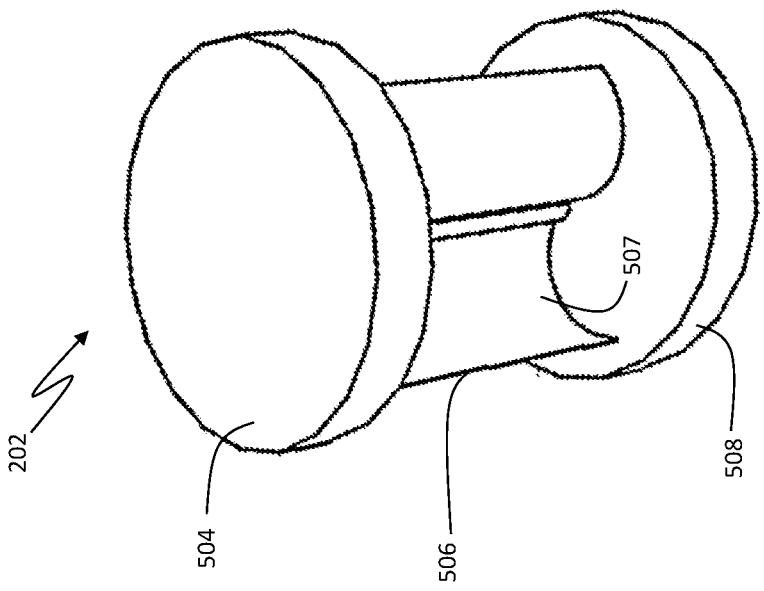
FIG. 5A shows a perspective view of the left wind turbine.
Figure 5D:
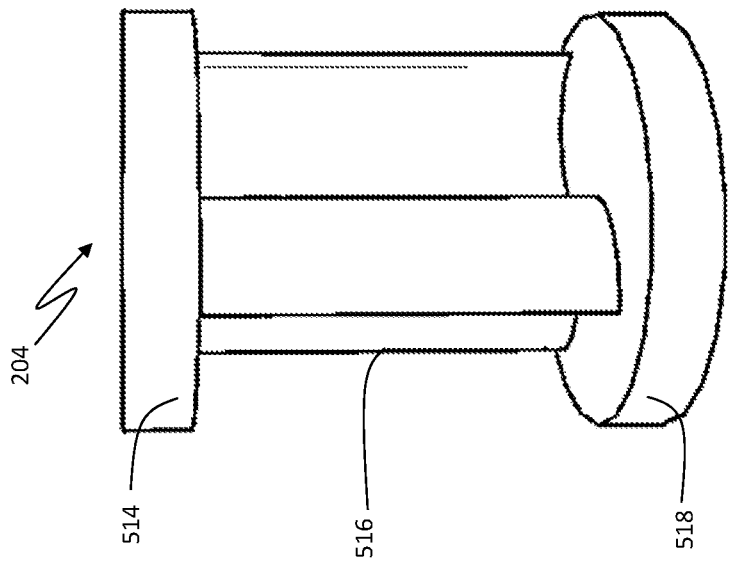
FIG. 5D shows a side view of the right wind turbine.
Figure 5C:
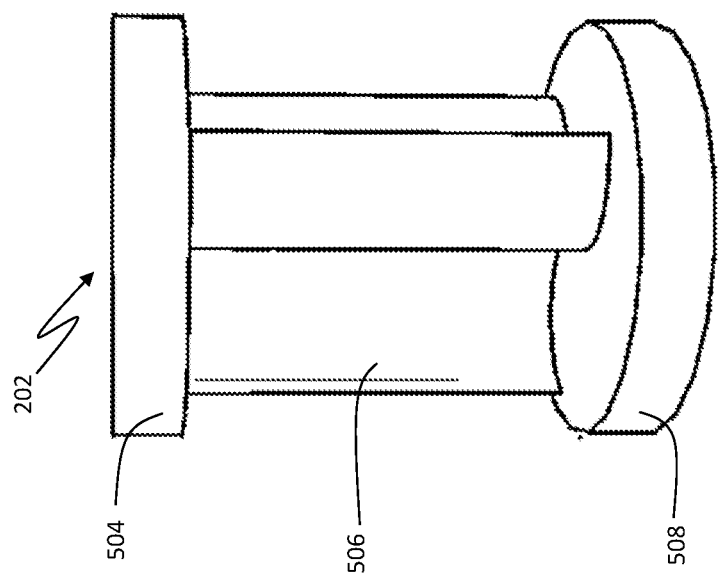
FIG. 5C shows a side view of the left wind turbine.

FIG. 5A shows a perspective view of the left wind turbine 202. FIG. 5C shows a side view of the left wind turbine 202. Turbine 202 comprises a bottom portion 508, and a top portion 504. The bottom portion 508 and top portion 504 may be circular, and disk-shaped. The blade 506 may have a curved surface 507 to catch wind, causing the rotation of the turbine 202.

FIG. 5B shows a perspective view of the right wind turbine 204. FIG. 5D shows a side view of the right wind turbine 204. Turbine 204 comprises a bottom portion 518, and a top portion 514. The bottom portion 518 and top portion 514 may be circular, and disk-shaped. The blade 516 may have a curved surface 517 to catch wind, causing the rotation of the turbine 204.

Figure 5F:
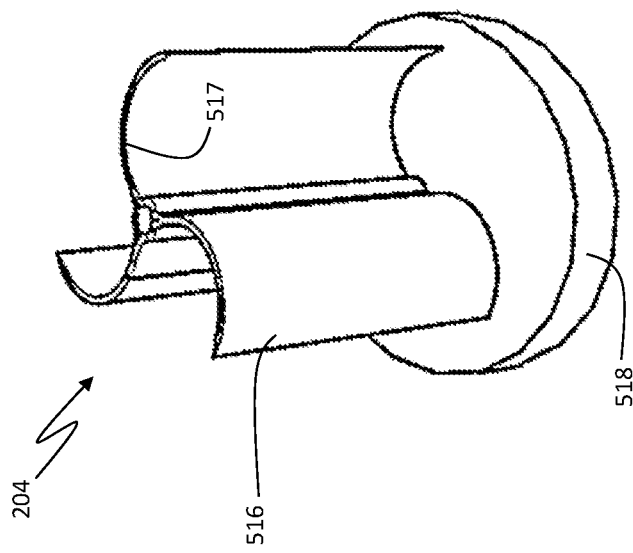
FIG. 5F shows a perspective view of the right wind turbine with the top cover removed to reveal the blade.
Figure 5E:
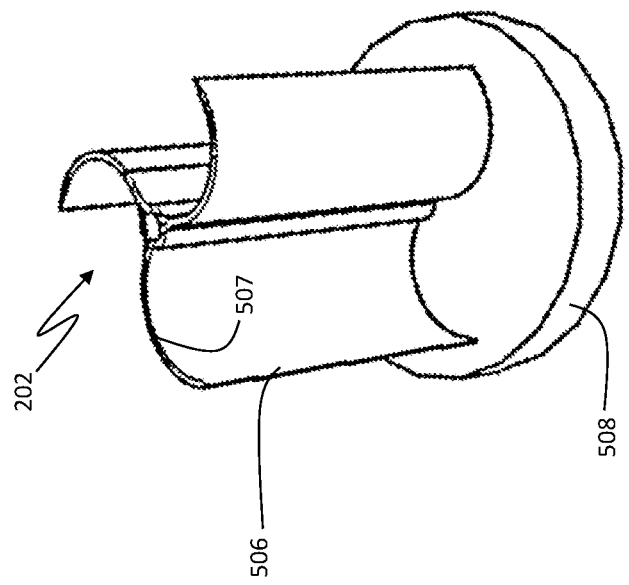
FIG. 5E shows a perspective view of the left wind turbine with the top cover removed to reveal the blade.

FIG. 5E shows a perspective view of the left wind turbine with the top cover removed to reveal the blade 506, having curved surface 507 for catching wind, and causing the rotation of the turbine. FIG. 5F shows a perspective view of the right wind turbine with the top cover removed to reveal the blade 516, having curved surface 517 for catching wind, and causing the rotation of the turbine. In embodiments, the first cylindrical wind turbine and the second cylindrical wind turbine are comprised of aluminum. In some embodiments, the first cylindrical wind turbine and the second cylindrical wind turbine are comprised of composite material. A wide variety of cylindrical turbines can be used in disclosed embodiments, including those disclosed in US Patent Application Publication 2014/037506, published on Dec. 25, 2014, the disclosure of which, is incorporated by reference herein, in its entirety.

Figure 6B:
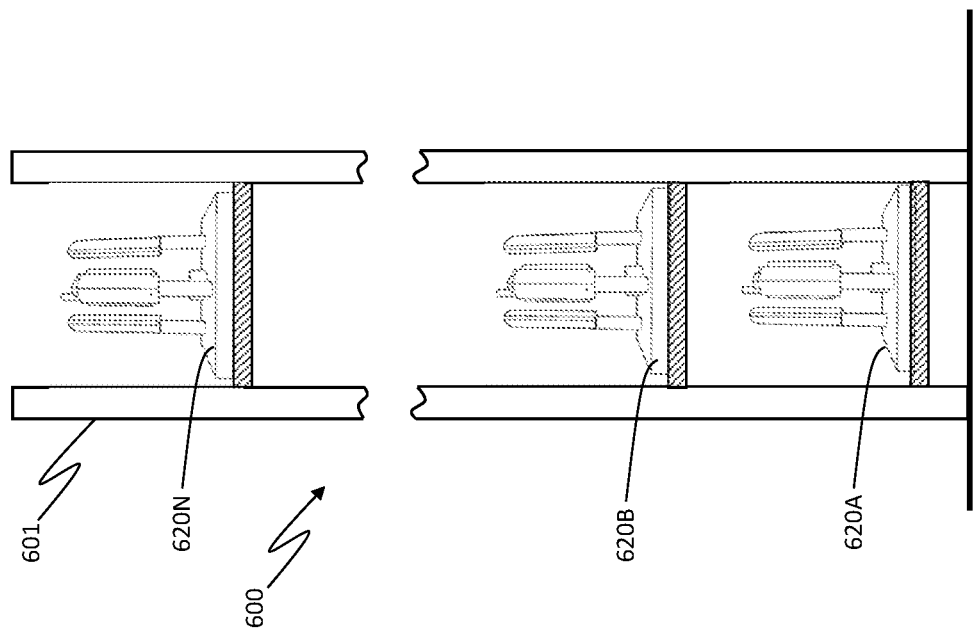
FIG. 6B shows a front view of the embodiment of FIG. 3A.
Figure 6A:
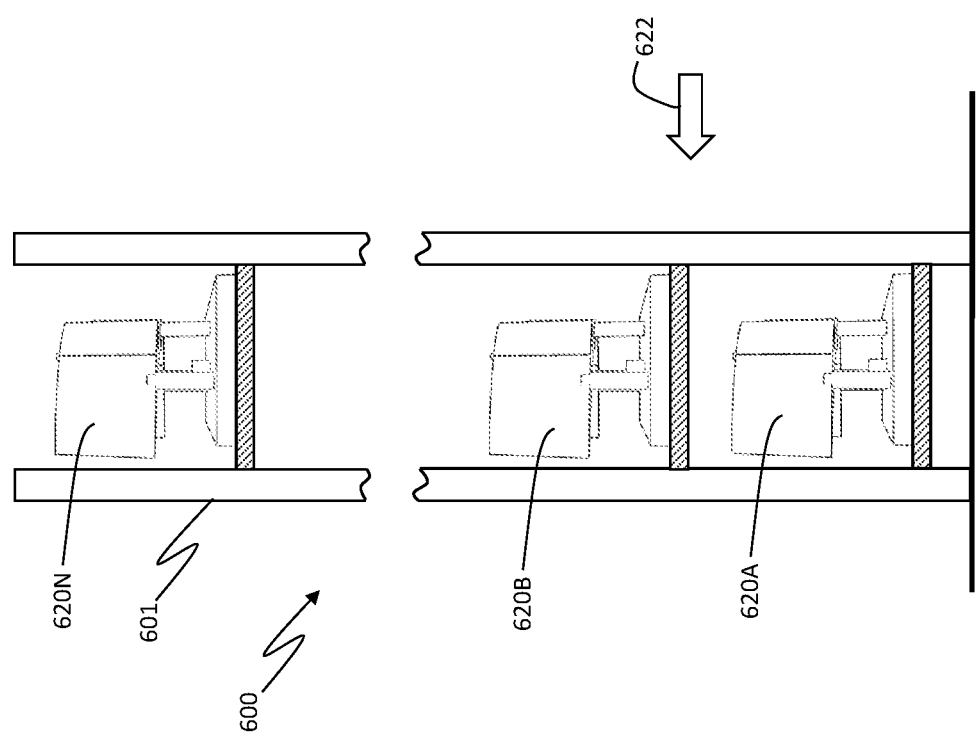
FIG. 6A shows a side view of a system in accordance with embodiments of the present invention.

FIG. 6A shows a side view of a system 600 in accordance with embodiments of the present invention. FIG. 6B shows a front view of the embodiment of FIG. 3A. System 600 includes a multi-level open-air structure, such as shown at 601. The open-air structure may be similar to the framework of a skyscraper, with girders and floors, but without windows and/or walls, thereby allowing wind to pass through. On each level, one or more renewable power generation systems, such as described in FIGS. 2-5, are placed on each floor. This allows a high-density group of renewable power generation systems, with multiple systems placed in close proximity to each other. As shown in FIG. 6A and FIG. 6B, there are three power generation systems shown, indicated as 620A, 620B, and 620N. In practice, there can be hundreds of such systems installed within an open-air structure. FIG. 6B is a front view, as viewed from the direction indicated by arrow 622 in FIG. 6A.

Embodiments include a wind power generation system, comprising: an open-air structure comprising a plurality of levels, wherein each level of the plurality of levels comprises a wind turbine system comprising: a first cylindrical wind turbine; a second cylindrical wind turbine disposed proximal to, and mechanically coupled to, the first cylindrical wind turbine; a diverter mounted to the platform and disposed on a front side of the first cylindrical wind turbine and second cylindrical wind turbine; a first airfoil disposed proximal to the first cylindrical wind turbine; a second airfoil disposed proximal to the second cylindrical wind turbine; and a driveshaft disposed adjacent to, and mechanically coupled to, the first cylindrical wind turbine.

Figure 7:
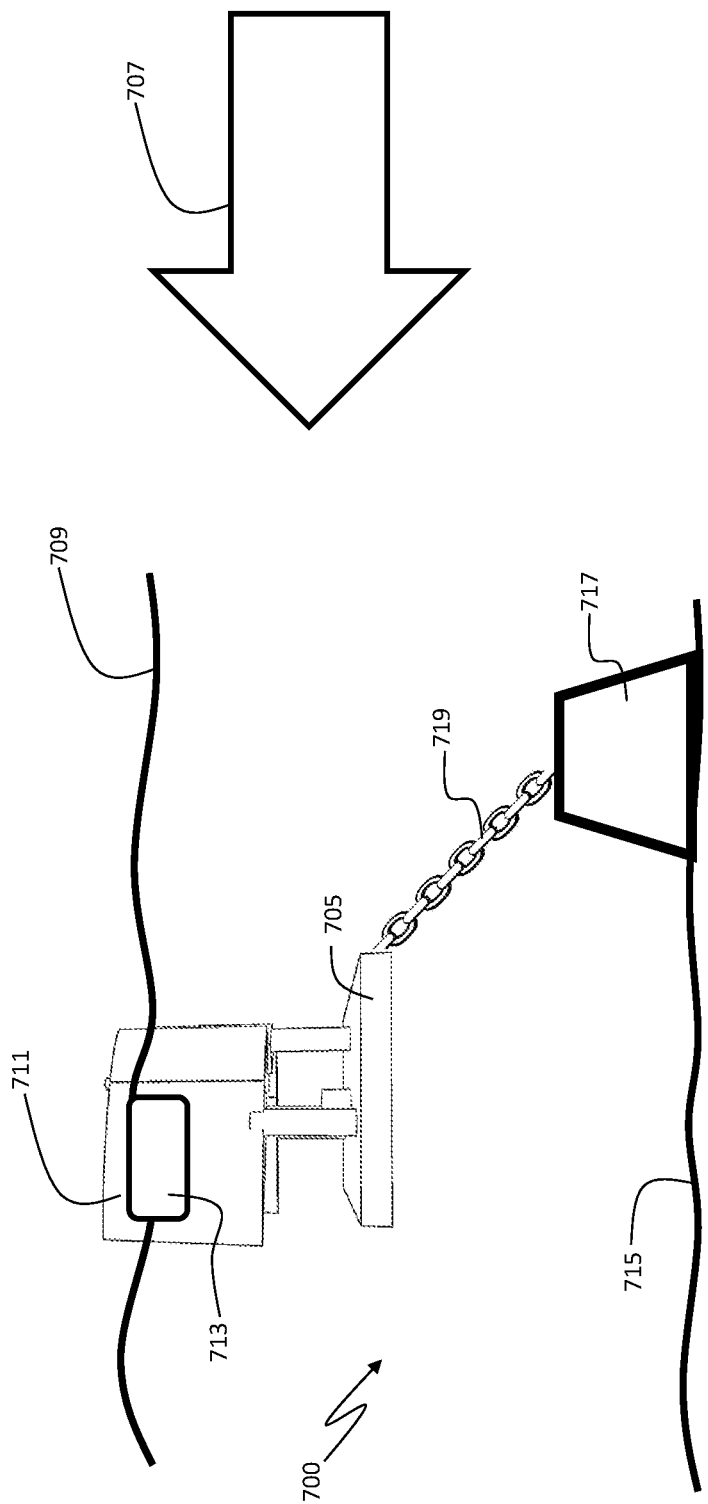
FIG. 7 shows a side view of a water-based embodiment of the present invention.

FIG. 7 shows a side view of a water-based embodiment of the present invention. In principle, the water-based embodiment operates similar to the wind power embodiment described in FIGS. 2-5. As seen in FIG. 7, system 700 includes a renewable power generation system 711, similar to apparatus 200 of FIG. 2A. A ballast tank 713 is affixed to each foil of the renewable power generation system 711. The ballast tank 713 allows partial buoyancy. Such that most of the power generation system 711 lies below the water surface 709. In some embodiments, the foils (e.g., 208 and 210) of the power generation system 711 may be hollow and also serve as ballast tanks. The foils may be used instead of, or in addition, ballast tanks 713. An anchor 717 rests on the bottom surface 715. The bottom surface 715 can be the bottom surface of a river, bay, ocean, or other moving body of water. A tether 719 connects the platform 705 to the anchor 717. In embodiments, the tether 719 can be a rope, chain, braided steel cable, or other suitable tether type. The tether serves to orient the power generation system 711 such that the flow of water current, indicated by arrow 707, causes the power generation system 711 to be oriented such that the turbines are moved by the flow of water current, causing power to be generated by the onboard generator (e.g., 242). Thus, embodiments are well-suited for tidal generation, where current direction may reverse in conjunction with tidal cycles. In some embodiments, additional tethers may be used. In some embodiments, the tether(s) may be attached to the platform at different and/or additional points than shown in FIG. 7.

Embodiments can include a hydropower generation system, comprising: a platform; a ballast tank affixed to an underside of the platform; an anchor affixed to the platform via a tether; a first cylindrical water turbine mounted on the platform; a second cylindrical water turbine mounted on the platform and disposed proximal to the first cylindrical water turbine; a diverter mounted to the platform and disposed on a front side of the first cylindrical water turbine and second cylindrical water turbine; a first airfoil mounted to the platform and disposed proximal to the first cylindrical water turbine; a second airfoil mounted to the platform and disposed proximal to the second cylindrical water turbine; and a driveshaft disposed adjacent to, and mechanically coupled to, the first cylindrical water turbine.

Figure 8:
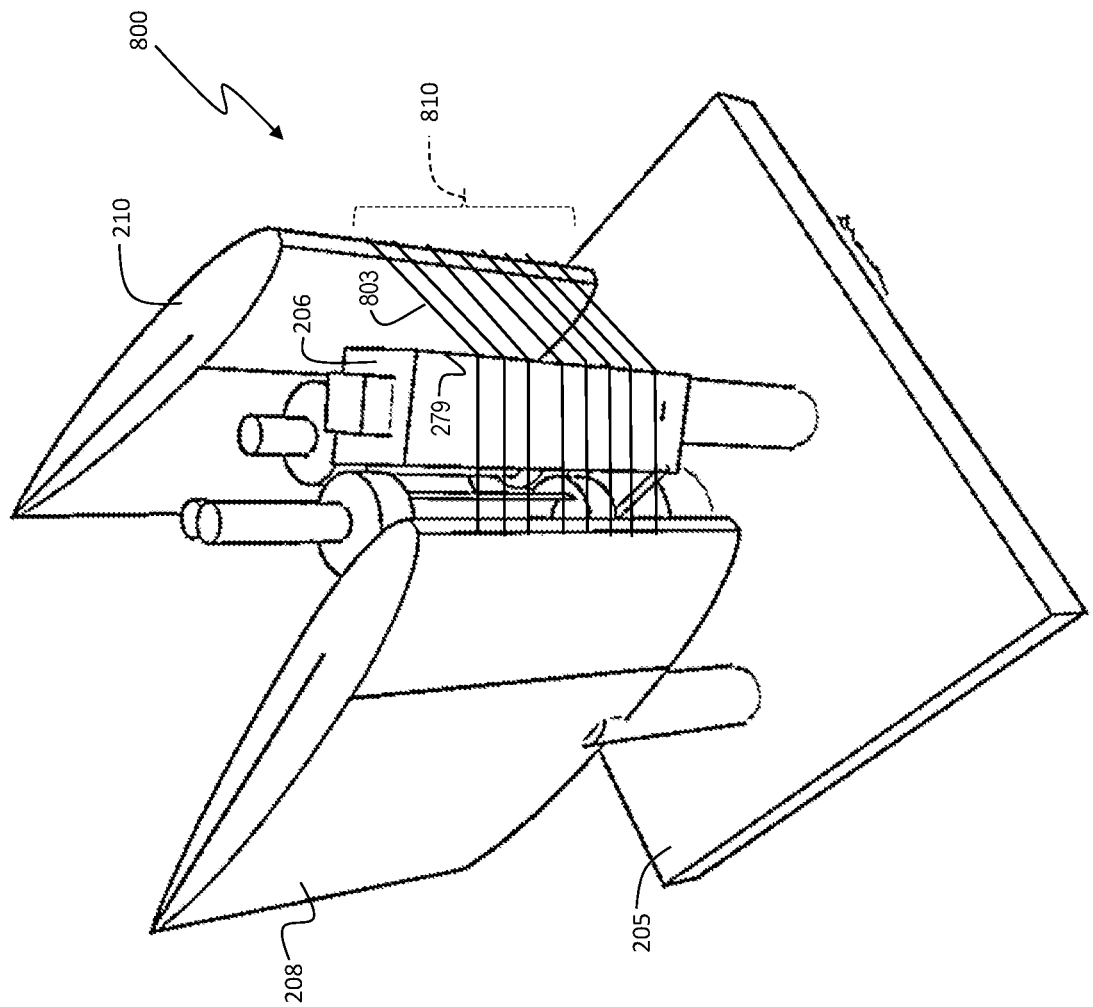
FIG. 8 shows an additional embodiment of the present invention utilizing an intake net.

FIG. 8 shows an additional embodiment 800 of the present invention utilizing an intake net 810. The intake net 810 is comprised of multiple wires, indicated generally as 803, that are affixed to the first airfoil 208, and the second airfoil 210, while also being in contact with the front edge 279 of the diverter 206. This serves to keep out debris, such as leaves and branches, as well as reducing the risk of birds entering the area where the turbines are. In this way, improved reliability may be achieved. In embodiments, each wire 803 is fairly thin, to have minimal aerodynamic impact. In embodiments, the wires 803 are comprised of steel. In some embodiments, the wires 803 are comprised of fiberglass. In some embodiments, the wires 803 are comprised of plastic. In some embodiments, the wires 803 have a diameter ranging from 3 millimeters to 10 millimeters. Embodiments can include an intake net affixed to the first airfoil and second airfoil, and disposed on a front edge of the diverter.

As can now be appreciated, disclosed embodiments provide improvements in renewable power generation. The design of disclosed embodiments provides a reliable, easy-to-maintain, power generation system that can be used in areas with limited space. Additionally, disclosed embodiments can be placed in vertical structures to increase renewable power generation in urban areas. Thus, disclosed embodiments improve the technical field of renewable energy.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. A wind turbine system comprising:
    a platform;
        a first cylindrical wind turbine mounted on the platform;
        a second cylindrical wind turbine mounted on the platform and disposed proximal to the first cylindrical wind turbine;
        a diverter mounted to the platform and disposed on a front side of the first cylindrical wind turbine and second cylindrical wind turbine;
        a first airfoil mounted to the platform and disposed proximal to the first cylindrical wind turbine;
        a second airfoil mounted to the platform and disposed proximal to the second cylindrical wind turbine; and
        a driveshaft disposed adjacent to, and mechanically coupled to, the first cylindrical wind turbine, wherein the diverter has a rectangular shape comprising four corners, and wherein three of the four corners are disposed such that they are located between the first airfoil and the second airfoil and behind a front edge of the first airfoil and second airfoil, and in front of a rear edge of the first airfoil and second airfoil.

2. The system of claim 1, further comprising an electric generator coupled to the driveshaft.

3. The system of claim 2, wherein the electric generator comprises a doubly-fed induction generator.

4. The system of claim 1, further comprising a first belt, the first belt mechanically coupling the first cylindrical wind turbine to the driveshaft.

5. The system of claim 4, further comprising a gearbox, the gearbox mounted on the diverter.

6. The system of claim 5, further comprising:
    a second belt, the second belt mechanically coupling the second cylindrical wind turbine to the gearbox; and
    a third belt, the third belt mechanically coupling the gearbox to the first cylindrical wind turbine.

7. The system of claim 6, wherein the gearbox comprises:
    a first gear;
    a second gear, the second gear interlocked with the first gear;
    a first pulley, the first pulley mechanically coupled to the first gear; and
    a second pulley, the second pulley mechanically coupled to the second gear.

8. The system of claim 7, wherein the first pulley is mounted on a first post having a first height, and wherein the second pulley is mounted on a second post having a second height, and wherein the first height is unequal to the second height.

9. The system of claim 1, further comprising an intake net affixed to the first airfoil and second airfoil, and disposed on a front edge of the diverter.

10. The system of claim 1, wherein the first cylindrical wind turbine and the second cylindrical wind turbine are comprised of aluminum.

11. The system of claim 1, wherein the first cylindrical wind turbine and the second cylindrical wind turbine are comprised of composite material.

12. A wind power generation system, comprising:
    an open-air structure comprising a plurality of levels, wherein each level of the plurality of levels comprises a wind turbine system comprising:
        a platform;
        a first cylindrical wind turbine mounted on the platform;
        a second cylindrical wind turbine mounted on the platform and disposed proximal to the first cylindrical wind turbine;
        a diverter mounted to the platform and disposed on a front side of the first cylindrical wind turbine and second cylindrical wind turbine;
        a first airfoil mounted to the platform and disposed proximal to the first cylindrical wind turbine;
        a second airfoil mounted to the platform and disposed proximal to the second cylindrical wind turbine; and
        a driveshaft disposed adjacent to, and mechanically coupled to, the first cylindrical wind turbine, wherein the diverter has a rectangular shape comprising four corners, and wherein three of the four corners are disposed such that they are located between the first airfoil and the second airfoil and behind a front edge of the first airfoil and second airfoil, and in front of a rear edge of the first airfoil and second airfoil.

13. The system of claim 12, wherein each wind turbine system further comprises an electric generator coupled to the driveshaft.

14. The system of claim 13, wherein each electric generator comprises a doubly-fed induction generator.

15. The system of claim 12, wherein each wind turbine system further comprises an intake net affixed to the first airfoil and second airfoil, and disposed on a front side of the diverter.

16. A hydropower generation system, comprising:
    a platform;
    an anchor affixed to the platform via a tether;
    a first cylindrical water turbine mounted on the platform;

a second cylindrical water turbine mounted on the platform and disposed proximal to the first cylindrical water turbine;

a diverter mounted to the platform and disposed on a front side of the first cylindrical water turbine and second cylindrical water turbine;

a first airfoil mounted to the platform and disposed proximal to the first cylindrical water turbine;

a second airfoil mounted to the platform and disposed proximal to the second cylindrical water turbine;

a ballast tank affixed to each airfoil; and a driveshaft disposed adjacent to, and mechanically coupled to, the first cylindrical water turbine, wherein the diverter has a rectangular shape comprising four corners, and wherein three of the four corners are disposed such that they are located between the first airfoil and the second airfoil and behind a front edge of the first airfoil and second airfoil, and in front of a rear edge of the first airfoil and second airfoil.

17. The system of claim 16, further comprising an electric generator coupled to the driveshaft.

18. The system of claim 17, wherein the electric generator comprises a doubly-fed induction generator.

\* \* \* \* \*